March 6, 1956  H. H. HARADA  2,737,345

QUICK RESET WHEEL ASSEMBLY

Filed May 1, 1952

Inventor
Henry H. Harada
By
Willits, Helwig & Baillio
Attorneys

United States Patent Office 2,737,345
Patented Mar. 6, 1956

2,737,345

QUICK RESET WHEEL ASSEMBLY

Henry H. Harada, Grand Blanc, Mich., assignor to General Motors Corporation, Detroit, Mich., a corporation of Delaware Application May 1, 1952, Serial No. 285,517

10 Claims. (Cl. 235—144)

This invention relates to quick re-set odometer wheel assemblies.

The primary object of the invention is to provide an improved, economical to manufacture, readily assembled quick re-set odometer wheel assembly in which a ratchet spring in the odometer wheel assembly is engaged by a lineally grooved odometer shaft to rotate the odometer wheel in one direction to re-set the same responsive to manual turning of the odometer shaft, the said ratchet spring being so formed and mounted in the odometer wheel as to permit the odometer wheel to be rotated by odometer mechanism in the opposite direction on the odometer shaft with a minimum of frictional resistance from the ratchet spring.

Another object of the invention is to provide a lightly spring loaded ratchet odometer wheel assembly driven for re-set from a central shaft through a ratchet spring wherein the exact annular relationship between the shaft and the odometer wheel is maintained regardless of the amount of pressure applied against the ratchet spring carried by the ratchet wheel.

A further object of the invention is to provide a ratchet type odometer wheel assembly which may be readily mounted on and removed from its drive shaft.

Other objects of the invention will become apparent by reference to the following detailed description taken in connection with the accompanying drawings, in which.

Figure 1:
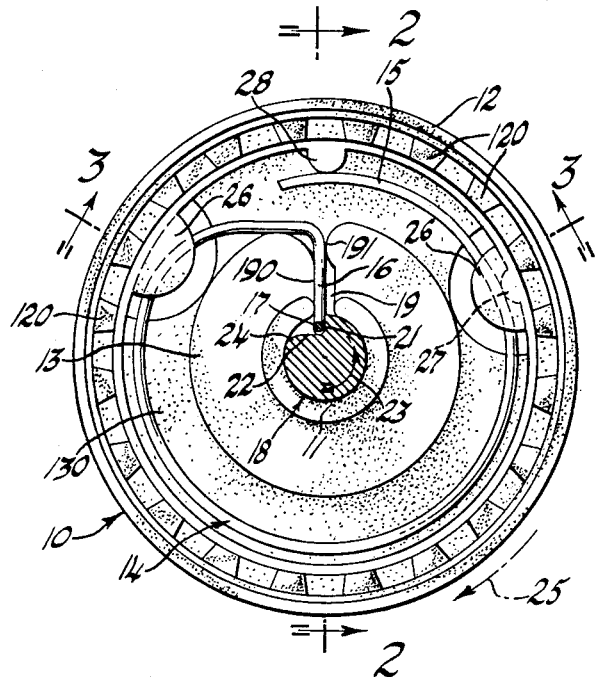
Fig. 1 is a side elevational view of a quick re-set odometer wheel assembly embodying the invention shown mounted on the odometer shaft.
Figure 2:
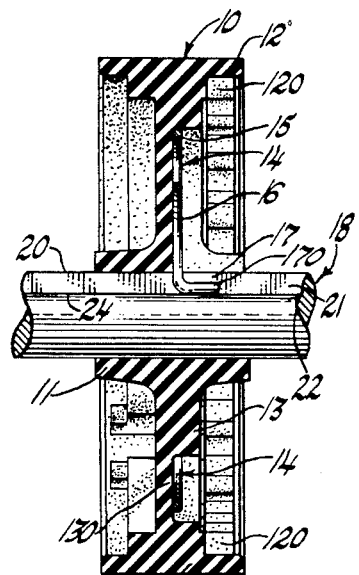
Fig. 2 is a vertical sectional view taken on the line 2—2 of Fig. 1.
Figure 3:
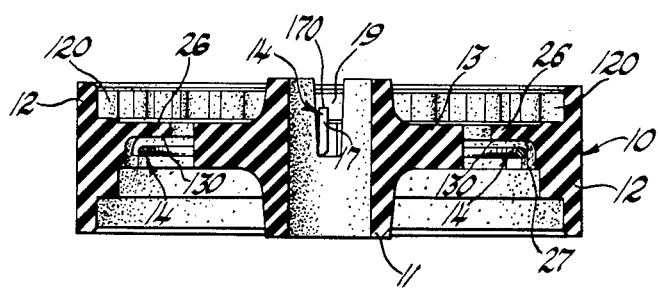
Fig. 3 is a sectional view taken on the line 3—3 of Fig. 1 with the odometer wheel assembly removed from the odometer shaft.

Referring now to the drawings wherein like numerals refer to like and corresponding parts throughout the several views, the particular embodiment of the odometer wheel assembly disclosed for illustrative purposes comprises an odometer wheel 10 preferably formed of a suitable plastic by molding or otherwise to include a hollow hub 11, a rim 12 and a suitable web 13 therebetween formed with an annular depressed portion 130 adjacent the rim 12 to accommodate a generally spiral ratchet spring 14 having a free outer end 15 and a radially reciprocable inner end 16 hooked at 17 for disposition longitudinally of the odometer shaft 18 onto which the odometer wheel 10 is rotatably mounted. The said hub 11 and web 13 between the hub 11 and the depressed portion 130 of the web 13 are provided with a radially disposed groove 19 to receive the radially reciprocable inner end 16 of the spiral ratchet spring 14 as shown in the drawings, the bottom of the said groove 19 being disposed in the same plane as the surface of the depressed portion 130 of the web 13.

The odometer shaft 18 is lineally grooved at 20 in a manner to provide a radially disposed re-set drive shoulder 21 and a transverse ratchet spring seat 22 disposed generally normal to the said re-set drive shoulder 21 of the odometer shaft 18. The said re-set drive shoulder 21 of the odometer shaft 18 engages the hooked portion 17 of the inner end 16 of the ratchet spring 14 to rotate the odometer wheel 10 counterclockwise as viewed in Fig. 1 when the odometer shaft 18 is turned in that direction as indicated by the arrow 23. The outer portion of the spring seat 22 of the odometer shaft 18 is formed to a radius or otherwise blended at 24 into the periphery of the odometer shaft 18 whereby to permit an easy cam action to move the inner end 16 of the ratchet spring 14 radially outward when the odometer wheel 10 is ratcheted in respect to the odometer shaft 18 by being driven clockwise as indicated by the dot and dash arrow 25 in Fig. 1. The hooked portion 17 of the ratchet spring 14 is suitably bent so that the extreme end 170 thereof does not contact the seat 22 of the odometer shaft 18 to permit the odometer wheel 10 to be slid readily onto and off from the odometer shaft 18.

Any suitable means may be employed for manually turning the odometer shaft 18 to re-set the odometer or for driving the odometer wheel 10, none being shown inasmuch as such construction is not a part of the instant invention. However, the particular odometer wheel 10 disclosed for the purpose of illustrating the invention is provided with internal gear teeth 120 at the rim 12 thereof with which driving mechanism (not shown) cooperates.

Extending radially inwardly from the rim 12 of the odometer wheel 10 are tabs 26 which are axially spaced from the annular depressed portion 130 of the web 13 to serve as retainers for the spiral ratchet spring 14. This construction permits the ratchet spring 14 to be inserted readily in place. One or more protuberances 27 and 28 are radially inwardly disposed from the inner periphery of the rim 12 of the odometer wheel 10 to serve as point supports for the spiral ratchet spring 14 to support the free end 15 thereof at the inner periphery of the rim 12 to provide a spring reaction point or points circumferentially distant from the radially reciprocable inner end 16 of the said ratchet spring 14 when the said radially disposed inner end 16 of the ratchet spring 14 reciprocates during its ratcheting movement. This construction assures the existence of a long unsupported spiral spring under all conditions and thereby permits the use of a relatively large diameter ratchet spring 14 and yet obtains relatively light spring action therewith.

Referring now particularly to Fig. 1, it will be observed that the radially disposed groove 19 in the odometer wheel 10 is wider than the diameter of the spiral ratchet spring 14. The wall at one side of the groove 19 is formed to provide a long land 190 adjacent the hub 11 while the wall at the other side of the groove 19 is formed to provide a spot land 191 spaced radially outward from the long land 190. The long land 190 is disposed in circumferentially spaced relationship in respect to the re-set drive shoulder on the odometer shaft 18 so that when the odometer wheel 10 is being turned in its re-set direction by the odometer shaft 18, pressure from the re-set drive shoulder 21 is applied to the odometer wheel 10 through the radially reciprocable inner end 16 of the spiral ratchet spring, and the reaction is taken by the lever couple between the long land 190 and the spot land 191. When odometer wheel 10 is driven in the direction indicated by the dot and dash arrow 25, substantially no bearing pressure is exerted between the radially disposed inner end 16 of the ratchet spring 14 and long land 190 which permits the said inner end 16 of the ratchet spring 14 to reciprocate freely during the ratcheting of the odometer wheel 10 in respect to the odometer shaft 18.

The foregoing construction not only provides an economical odometer wheel assembly which is readily mounted onto the odometer shaft but assures positive and exact annular relationship between the odometer wheel and the odometer shaft and smooth ratchet action with a minimum of frictional resistance.

Although but a single embodiment of the invention has been disclosed and described, it is obvious that many changes may be made in the size, shape, arrangement and detail of the various elements of the invention, without departing from the spirit and scope thereof as defined by the appended claims.

I claim:

1. An odometer wheel assembly of the type mountable on an odometer shaft lineally grooved to provide a radially disposed re-set drive shoulder and a spring seat substantially normal thereto comprising an odometer wheel including a hollow hub, a rim and a web, said web being between said hub and rim, the said web portion having a radially disposed groove therein extending through said hub, and a spiral spring element disposed within the said rim having a free outer end and an inner radially disposed portion positioned in said radially disposed groove biased against said shaft when said odometer wheel assembly is mounted on said shaft.

2. An odometer wheel assembly of the type mountable on an odometer shaft lineally grooved to provide a radially disposed re-set drive shoulder and a spring seat substantially normal thereto comprising an odometer wheel including a hollow hub, a rim and a web, said web being between said hub and rim, said web having an annular depressed portion adjacent said rim, the said web portion having a radially disposed groove therein extending from said annular depressed portion through said hub, a spiral spring element disposed within the said annular depressed portion having a free outer end, and an inner radially disposed portion positioned in said radially disposed groove biased against said shaft when said odometer wheel assembly is mounted on said shaft.

3. An odometer wheel assembly of the type mountable on an odometer shaft lineally grooved to provide a radially disposed re-set drive shoulder and a spring seat substantially normal thereto comprising an odometer wheel including a hollow hub, a rim and a web, said web being between said hub and rim, said web having an annular depressed portion adjacent said rim, the said web portion having a radially disposed groove therein extending from said annular depressed portion through said hub, and a spiral spring element disposed within the said annular depressed portion having a free outer end and an inner radially disposed portion positioned in said radially disposed groove biased against said shaft when said odometer wheel assembly is mounted on said shaft, the said inner radially disposed portion of said spiral spring element being hooked parallel to the re-set drive shoulder of said shaft with the extreme end of said hook spaced from the said shaft.

4. An odometer wheel assembly of the type mountable on an odometer shaft lineally grooved to provide a radially disposed re-set drive shoulder and a spring seat substantially normal thereto comprising an odometer wheel including a hollow hub, a rim and a web, said web being between said hub and said rim and having an annularly depressed portion adjacent said rim, the said web portion having a radially disposed groove therein extending through said hub, a spiral spring element disposed within the annular depressed portion of said web having a free outer end and an inner radially disposed portion positioned in said radially disposed groove biased against said shaft when said odometer wheel assembly is mounted on said shaft, a relatively long land formed in said web at one side of said radial groove therein adjacent said shaft, and a spot land formed in said web at the other side of said groove spaced from said shaft, the said long land being circumferentially oppositely disposed in respect to the re-set drive shoulder on said odometer shaft.

5. An odometer wheel assembly of the type mountable on an odometer shaft lineally grooved to provide a radially disposed re-set drive shoulder and a spring seat substantially normal thereto comprising an odometer wheel including a hollow hub, a rim and a web, said web being between said hub and said rim, said web having an annular depressed portion adjacent said rim, the said web portion having a radially disposed groove therein extending from said annular depressed portion through said hub, a spiral spring element disposed within the said annular depressed portion having a free outer end and an inner radially disposed portion positioned in said radially disposed groove biased against said shaft when said odometer wheel assembly is mounted on said shaft, a relatively long land formed in said web at one side of said radial groove therein adjacent said shaft, and a spot land formed in said web at the other side of said groove spaced from said shaft, the said long land being circumferentially oppositely disposed in respect to the re-set drive shoulder on said odometer shaft.

6. An odometer wheel assembly as claimed in claim 5 with means disposed within said rim radially supporting said spiral spring near the free end thereof.

7. In combination, a shaft having an axially extending groove thereon, a wheel having a hub portion and a web portion, said wheel having a radially disposed groove extending through a part of said hub portion, and a spring element positioned against said web portion and having a free outer end and a radially disposed inner end extending through said groove in said hub portion to engage said groove in said shaft when said wheel is mounted on said shaft.

8. In combination, a shaft having an axially extending groove thereon, a wheel having a hub portion and a web portion, said wheel having a radially disposed groove extending through a part of said hub portion, a spiral spring element positioned against said web portion and having an inner radially disposed portion extending through said groove in said hub portion to engage said groove in said shaft when said wheel is mounted on said shaft.

9. A wheel assembly of the type mountable on a shaft lineally grooved to provide a radially disposed re-set drive shoulder and a spring seat substantially normal thereto comprising a wheel including a hollow hub, a rim, and a web between said hub and rim, said web having a radially disposed groove therein extending through said hub, and a spiral spring element disposed within the said rim having a free outer end and an inner radially disposed portion positioned in said radially disposed groove biased against said shaft when said wheel assembly is mounted on said shaft.

10. The combination with a shaft having an axially extending groove therein and a wheel having a rim, a hub with a radially extending groove therein, and a radially extending web between the said rim and hub of the wheel, of a spiral spring element carried by the wheel and having a free outer end adjacent the wheel rim and a radially disposed inner end portion extending through the radial groove in said hub portion and engaging said axially extending groove in said shaft when the wheel is mounted on the shaft.

References Cited in the file of this patent

UNITED STATES PATENTS

| | | |
|---|---|---|
| 1,471,306 | Chase | Oct. 16, 1923 |
| 2,342,325 | Bliss | Feb. 22, 1944 |
| 2,444,570 | Lawrence et al. | July 6, 1948 |
| 2,540,033 | Leathers | Jan. 30, 1951 |
| 2,550,950 | Young | May 1, 1951 |